3,365,452
PROCESS FOR PRODUCTION OF CHLORO-
DIAZINES AND CHLOROTRIAZINES
Hans Weidinger and Gerhard Wellenreuther, Ludwigshafen (Rhine), Germany, assignors to Badische Anilin- & Soda-Fabrik Aktiengesellschaft, Ludwigshafen (Rhine), Germany
No Drawing. Filed Nov. 20, 1961, Ser. No. 153,755
Claims priority, application Germany, Nov. 26, 1960,
B 60,244
8 Claims. (Cl. 260—248)

This invention relates to a new process for the production of chlorinated heterocyclic compounds, especially of chlorinated diazines and triazines.

It is known that heterocyclic chlorine compounds are obtained by reaction of the appropriate hydroxy compounds with chlorides of phosphorus or sulfur, for example with phosphorus oxychloride, phosphorus pentachloride or thionyl chloride, with or without the addition of bases. These methods have the disadvantage that, during the working up of the reaction mixture, partial hydrolysis of the chlorinated compound is in many cases unavoidable and impure compounds are therefore obtained. Moreover, the products obtainable by these methods contain small amounts of difficultly removable sulfur-containing or phosphorus-containing compounds and are therefore unsuitable as initial materials for reactions in which sensitive catalysts are employed, for example for catalytic hydrogenation reactions. It has also been suggested that in nitrogenous heterocyclic compounds containing a hydroxyl group, the hydroxyl group can be replaced by chlorine by the action of phosgene. In the diazine and triazine series, this method does not lead to any useful results.

It is an object of the present invention to provide a process for the production of chlorinated diazines and triazines of very high purity in which the chlorine atoms are adjacent to at least one ring nitrogen atom.

Another object of the invention is to provide a process for the production of chlorinated diazines and triazines which can be subjected directly to catalytic hydrogenation.

A further object of the invention is to provide a process by which hydroxy compounds of the diazine and triazine series in which the hydroxyl groups are adjacent to at least one ring nitrogen atom can be converted by means of phosgene into the corresponding chlorine compounds.

These objects are achieved by reacting substituted or unsubstituted diazines or triazines containing one or two hydroxyl groups in vicinal position to at least one ring nitrogen with phosgene at elevated temperatures, preferably at 60° to 160° C., in the presence of a N,N-dialkyl-substituted or N-alkyl-N-aryl-substituted amide of a lower fatty acid or an N-alkyl-substituted lactam and in the presence of a solvent or diluent.

According to the new process, the chlorine-containing heterocyclic compounds are obtained in high yields and practically free from impurities, since complete removal of the carbon dioxide and hydrogen chloride formed in the reaction presents no difficulty.

Suitable starting materials are diazines and triazines, i.e., compounds derived from pyridazine, pyrimidine or pyrazine, and from 1,3,5-, 1,2,4- or 1,2,3-triazine, respectively. In addition to the hydroxyl group or groups in α-position to at least one ring nitrogen, they may also contain from one to three further substituents. These substituents may be inert atoms or groups, for example halogen atoms, alkyl radicals, aryl radicals, aryl radicals substituted by halogen atoms, aryl radicals substituted by alkoxy groups, aryl radicals substituted by nitro groups, condensed on benzene rings, carboxychloride groups, sulfochloride groups, or N,N-dialkyl-substituted sulfonamide groups whose alkyl radicals contain from 1 to 3 carbon atoms. The said further substituents of the diazines or triazines may also be carboxyl groups (—COOH) or sulfonic acid groups (—SO$_3$H). These groups may also be present in the above-named substituents, for example in alkyl or aryl groups. During the reaction, the carboxyl groups and sulfonic acid groups are converted into inert groups, viz, carboxychloride groups (—COCl) and sulfochloride groups (—SO$_2$Cl), respectively. Examples of suitable starting materials are:

3-hydroxypyridazine,
3,6-dihydroxypyridazine,
3-hydroxy-6-methylpyridazine,
3-hydroxy-6-phenylpyridazine,
3,6-dihydroxy-4-methylpyridazine,
3,6-dihydroxy-4,5-dimethylpyridazine;
2-hydroxypyrimidine,
4-hydroxypyrimidine,
2-hydroxy-4,6-dimethylpyrimidine,
4-hydroxy-2-methylpyrimidine,
4-hydroxy-2-phenylpyrimidine,
4-hydroxy-2,6-dimethylpyrimidine,
4-hydroxy-6-methyl-2-phenylpyrimidine,
6-hydroxy-4,5-dimethylpyrimidine,
2,4-dihydroxypyrimidine,
5-methyl-2,4-dihydroxypyrimidine,
6-methyl-2,4-dihydroxypyrimidine,
4,6-dihydroxy-6-phenylpyrimidine;
2-hydroxyquinazoline,
4-hydroxyquinazoline,
2,4-dihydroxyquinazoline,
4-hydroxy-2-methylquinazoline,
2-hydroxy-4-phenylquinazoline,
2,4-dihydroxy-6-chloroquinazoline,
2,4-dihydroxy-6,8-dichloroquinazoline,
4-hydroxy-7-nitroquinazoline,
2,4-dihydroxy-6-nitroquinazoline,
4-hydroxy-2-phenyl-6-nitroquinazoline,
4-hydroxy-2-p-nitrophenylquinazoline,
4-hydroxy-2-m-nitrophenylquinazoline,
4-hydroxy-2-p-chlorophenylquinazoline,
4-hydroxy-2-p-methoxyphenylquinazoline;
2-hydroxypyrazine,
2,3-dihydroxypyrazine,
2-hydroxy-3-methylpyrazine,
2-hydroxy-3,5-dimethylpyrazine,
2-hydroxy-3,6-dimethylpyrazine,
2-hydroxy-5,6-dimethylpyrazine,
2-hydroxy-3-phenylpyrazine,
2-hydroxy-5,6-diphenylpyrazine,
2-hydroxy-3-methyl-5-phenylpyrazine;
2-hydroxyquinoxaline,
2,3-dihydroxyquinoxaline,
5-methyl-2-hydroxyquinoxaline,
7-methyl-2-hydrovyquinoxaline,
3-methyl-2-hydroxyquinoxaline,
6-methyl-2-hydroxyquinoxaline,
3,6-dimethyl-2-hydroxyquinoxaline,
3,7-dimethyl-2-hydroxyquinoxaline,
6-chloro-2-hydroxyquinoxaline,
3-phenyl-2-hydroxyquinoxaline,
7-nitro-2-hydroxyquinoxaline;
4-hydroxy-1,2,3-benzotriazine,
3-hydroxy-5,6-dimethyl-1,2,4-triazine,
3,5-dihydroxy-1,2,4-triazine,
3-hydroxy-1,2,4-benzotriazine,
2-hydroxy-4,6-diphenyl-1,3,5-triazine,
2,4-dihydroxy-6-methyl-1,3,5-triazine,
2,4-dihydroxy-6-phenyl-1,3,5-triazine,
2,4-dihydroxy-6-p-methoxyphenyl-1,3,5-triazine, 2,4-dihydroxy-6-p-chlorophenyl-1,3,5-triazine,
2,4-dihydroxy-6-m-nitrophenyl-1,3,5-triazine,
2,4-dihydroxy-6-o-tolyl-1,3,5-triazine,
2,4-dihydroxy-6-p-tolyl-1,3,5-triazine,
2-(m-chlorosulfophenyl)-4,6-dihydroxy-1,3,5-triazine,
2-(p-carboxyphenyl)-4-hydroxy-1,3,5-triazine,
2-(m-carboxyphenyl)-4,6-dihydroxy-1,3,5-triazine,
2-(m-dimethylaminosulfophenyl)-4,6-dihydroxy-1,3,5-triazine,
2-(m-sulfophenyl)-4,6-dihydroxy-1,3,5-triazine.

As a rule, the heterocyclic compounds which may be used contain not more than 20 carbon atoms in all. The alkyl groups which may be present as substituents on the heterocyclic rings may contain 1 to 4 carbon atoms. The aryl groups which may be present as substituents on the heterocyclic rings, or the condensed-on benzene rings may contain 1 to 3 halogen atoms, especially chlorine atoms, 1 nitro group, 1 to 3 alkoxy groups with alkoxy radicals with 1 to 4 carbon atoms or 1 to 3 alkyl groups with 1 to 4 carbon atoms.

The process is particularly suitable for the chlorination of hydroxyquinazolines, hydroxyquinoxalines, and 1,3,5-triazines with 1 or 2 hydroxyl groups on the triazine ring and in vicinal position to at least one ring nitrogen atom. With 1,3,5-triazines, exceptionally good results, i.e., high yields and products of excellent quality, are obtained in the chlorinations of aryl-1,3,5-triazines with 1 or 2 hydroxyl groups on the triazine ring. Especially suitable starting materials are those which contain a total of up to 17 carbon atoms and any of the substituents specified above.

The common feature of the N,N-dialkylamides, N-alkyl-N-aryl-amides and N-alkylated lactams used in the process according to the invention is that they are open or cyclic carboxylic acid amides in which the hydrogen atoms on the acid amide nitrogen atoms are substituted by carbon-containing groups. They may be represented by the formula:

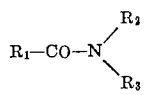

in which $R_1$ denotes a hydrogen atom or an alkyl radical with 1 to 5 carbon atoms, $R_2$ denotes an alkyl radical with 1 to 4 carbon atoms, $R_3$ denotes an alkyl radical with 1 to 4 carbon atoms or an aryl radical with 6 to 9 carbon atoms, or $R_2$ and $R_3$ together denote an alkylene group with 2 to 8 methylene groups, one of which may be replaced by an oxygen atom, or $R_1$ and $R_3$ together denote an alkylene group with 3 to 7 carbon atoms.

Examples of suitable carboxylic acid amides and lactams are: dimethylformamide, diethylformamide, N-methyl - N - butylformamide, N - formylpyrrolidine, N-formylpiperidine, N - formylmorpholine, N - methylformanilide, N,N - dimethylacetamide, N,N - dimethylbutyramide, N-methylpyrrolidone, N-methylcaprolactam, N-butylpyrrolidone.

The reaction is conducted at elevated temperatures, preferably at 60° to 160° C. Below 60° C., the reaction takes place only slowly. In general, heating to temperatures above 160° C. is not necessary, and in many cases even injurious.

The reaction may be represented as follows:

Approximately equivalent amounts of heterocyclic hydroxy compound and phosgene are employed for the reaction, i.e., a mole ratio of about 1:1 is used when one hydroxyl group in the molecule is replaced, and a mole ratio of about 1:2 when two hydroxyl groups are replaced. An excess of phosgene is not injurious. The N,N-disubstituted carboxylic acid amides or N-substituted lactams, which are used as catalytically active additives, may be added in small amounts, for example 1 to 5% with reference to the heterocyclic hydroxy compound. However, larger amounts of N,N-disubstituted carboxylic acid amides or N-substituted lactams may also be used. Additions of 10 to 50 mole percent per mole of heterocyclic hydroxy compound are preferred.

All solvents which are inert under the reaction conditions and have molecular weights of about 70 to 200 are suitable for use as solvents or diluents in the process according to the present invention. In particular, there are used saturated aliphatic hydrocarbons, aromatic hydrocarbons or halogenated saturated aliphatic or aromatic hydrocarbons, e.g., isooctane, gasoline fractions boiling between 80° and 200° C., cyclohexane, methylcyclohexane, benzene, toluene, xylenes, tetrahydronaphthalene, decahydronaphthalene, chloroform, carbon tetrachloride, chlorobenzene, o-, m- and p-dichlorobenzene, and trichlorobenzenes. Nitro compounds, for example nitrobenzene, or high-boiling ethers, such as anisole or dioxane, may, however, also be used.

In general, solutions or suspensions are used which contain from 10 to 80% by weight of heterocyclic hydroxy compound.

The process may be carried out, for example, by passing phosgene into a heated solution or suspension of the hydroxy compound, which also contains the substituted carboxylic acid amide. Conversely, it is also possible to prepare a phosgene solution, introduce the hydroxy compound into the same, and then heat the reaction mixture. As a rule, the process is carried out at normal pressure. It may, however, also be carried out under slightly increased pressure, for example at pressures of up to 3 atmospheres or more.

The reaction can be controlled in various ways, for example by weighing the phosgene used or by continual sampling and testing for the presence of starting material. An expedient method is to use a solvent in which the heterocyclic hydroxy compound dissolves only with difficulty, but in which the halogen-containing compound is readily soluble. The formation of a clear solution then indicates that conversion is substantially complete. Solvents of this kind are those which have been described above, especially benzene.

In many cases, the halogen-containing heterocyclic compounds are deposited in crystalline form on cooling the solution. It may, however, be advantageous to first decompose, either wholly or partly, an intermediate adduct of the substituted carboxylic acid amide and phosgene by adding a small amount of a lower aliphatic alcohol, for example a monohydric alcohol with 1 to 4 carbon atoms, such as methanol or ethanol, or a dihydric alcohol, such as glycol, or glacial acetic acid, and then to filter the reaction mixture. If necessary, the solvent may be distilled off before the reaction mixture is worked up. In by far the majority of cases, the products obtained are analytically pure and, in general, need not be recrystallized. They may be catalytically hydrogenated without further purification.

Because of their high purity, the heterocyclic chlorine compounds obtainable according to the new process can be used with particular advantage for the preparation of dyes.

The invention will be further illustrated by, but is not limited to, the following examples. The parts specified in the examples are parts by weight.

*Example 1*

200 parts of 2-phenyl-4,6-dihydroxy-1,3,5-triazine is suspended in a mixture of 260 parts of o-dichlorobenzene and 90 parts of dimethylformamide. Phosgene is introduced at 80° to 90° C. with stirring, the 2-phenyl-4,6-dihydroxy-1,3,5-triazine gradually passing into solution. When all has dissolved, introduction of phosgene is continued for another 45 minutes to complete the reaction. The reaction mixture is then cooled to 5° C., 30 parts of methanol is added and the deposited crystals are filtered off by suction and washed with methanol. 205 parts of 2-phenyl-4,6-dichloro-1,3,5-triazine is obtained in the form of colorless coarse crystals of high purity. The melting point of the substance is 120° to 121° C.

If, for comparison purposes, phosgene is introduced for seven hours into a suspension of 100 parts of 2-phenyl-4,6-dihydroxy-1,3,5-triazine and 100 parts of o-dichlorobenzene at 100° C. with stirring, no dissolution takes place. When the mixture is cooled to room temperature and the crystals are filtered off by suction, washed with methanol and dried at 30° C., 99 parts of unchanged 2-phenyl-4,6-dihydroxy - 1,3,5 - triazine having a melting point of 284° to 286° C. is obtained.

If the phosgene is allowed to act on the 2-phenyl-4,6-dihydroxy-1,3,5-triazine at 165° C. instead of at 100° C. and otherwise the procedure described in the second paragraph of this example is followed, 99 parts of unchanged 2-phenyl-4,6-dihydroxy-1,3,5-triazine is recovered.

*Example 2*

Phosgene is introduced at 90° to 100° C. into a mixture of 300 parts of 2,4-dihydroxy-6,8-dichloroquinazoline, 350 parts of trichlorobenzene and 140 parts of dimethylformamide, while stirring. The 2,4 - dihydroxy - 6,8 - dichloroquinazoline gradually passes into solution. When all has dissolved, introduction of phosgene is continued for another 45 minutes to complete the reaction. The reaction mixture is then cooled to 5° C., and 50 parts of methanol is added. The crystals are filtered off by suction, washed with methanol, and dried at 40° C. 160 parts of 2,4,6,8-tetrachloroquinazoline is obtained in the form of pale yellow crystals having a melting point of 142° to 145° C.

*Example 3*

Phosgene is introduced at 90° to 100° C. into a suspension of 100 parts of 2-(3'-nitrophenyl)-4-hydroxyquinazoline in 250 parts of nitrobenzene and 45 parts of dimethylformamide, while stirring, until initial material can no longer be detected. The reaction mixture is cooled to 10° C., the crystal slurry filtered off by suction, washed with methanol and dried. The 2-(3'-nitrophenyl)-4-chloroquinazoline obtained is characterized by very high purity and melts at 182° to 183° C. The yield is 92 parts.

The 2-(3'-nitrophenyl)-4-hydroxyquinazoline used as initial material can be obtained as follows: 100 parts of 2-aminobenzamide is dissolved at room temperature (15° to 30° C.) in 500 parts by volume of glacial acetic acid and 500 parts by volume of saturated aqueous sodium acetate solution, while stirring. Into this solution a solution of 135 parts of 3-nitrobenzoyl chloride in 90 parts by volume of acetone is introduced in small portions. After stirring for one hour at room temperature, the reaction product is filtered off by suction, washed with water and dried. 74 parts of the 2-(m-nitrobenzoylamino)-benzamide thus obtained is introduced into a boiling mixture of 1000 parts by volume of 2 N aqueous sodium hydroxide solution and 50 parts by volume of pyridine. The solution is then filtered to remove impurities, cooled, and made weakly acid with acetic acid. The precipitate is filtered off by suction, washed acid-free with water, and dried. The product is 2-(3'-nitrophenyl)-4-hydroxyquinazoline.

*Example 4*

Phosgene is introduced at 90° to 100° C. into a suspension of 2-(4'-nitrophenyl)-4-hydroxyquinazoline in 260 parts of dichlorobenzene and 45 parts of dimethylformamide, while stirring, until initial material can no longer be detected. The reaction mixture is cooled to 10° C., the crystal slurry obtained is filtered off by suction, washed with methanol and dried. 88 parts of 2-(4'-nitrophenyl)-4-chloroquinazoline with a melting point of 188° to 190° C. is obtained.

The 2-(4'-nitrophenyl)-4-hydroxyquinazoline used as initial material can be obtained as follows: 100 parts of 2-aminobenzamide is dissolved at room temperature (15° to 30° C.) in 500 parts by volume of glacial acetic acid and 500 parts by volume of saturated aqueous sodium acetate solution, while stirring. Into this solution, a solution of 135 parts of 4-nitrobenzoyl chloride in 90 parts by volume of acetone is introduced in small portions. After stirring for one hour at room temperature, the reaction product is filtered off by suction, washed with water and dried. 74 parts of the 2-(p-nitrobenzoylamino)-benzamide thus obtained is introduced into a boiling mixture of 1000 parts by volume of 2 N aqueous sodium hydroxide solution and 50 parts by volume of pyridine. The solution is then filtered to remove impurities, cooled, and made weakly acid with acetic acid. The precipitate is filtered off by suction, washed acid-free with water, and dried. The product is 2-(4'-nitrophenyl)-4-hydroxyquinazoline.

*Example 5*

Phosgene is introduced at 130° C., while stirring well, into a suspension of 200 parts of 2-phenyl-4,6-dihydroxy-1,3,5-triazine in 260 parts of o-dichlorobenzene to which 20 parts of dimethylformamide has been added. When all has dissolved, introduction of phosgene is continued for another 45 minutes to complete the reaction. The reaction mixture is then cooled to 0° to 5° C., the chlorination product crystallizing out.

Then 10 parts of methanol is added with stirring, the crystal slurry is filtered off by suction, washed with methanol, and dried. 200 parts of pure 2-phenyl-4,6-dichloro-1,3,5-triazine having a melting point of 121° to 122° C. is obtained.

*Example 6*

Phosgene is introduced at 120° C. into a suspension of 50 parts of 2,3-dihydroxyquinoxaline, 10 parts of dimethylformamide and 120 parts of nitrobenzene, while stirring. When all has dissolved, introduction of phosgene is continued for another hour to complete the reaction. The reaction mixture is then cooled to 5° to 10° C. The precipitated crystals are filtered off by suction and washed with methanol. The yield is 55 parts of 2,3-dichloroquinoxaline having a melting point of 150° to 151° C.

*Example 7*

Phosgene is introduced at 125° C. into a suspension of 100 parts of 2-phenyl-4,6-dihydroxy-1,3,5-triazine in 130 parts of o-dichlorobenzene and 20 parts of N-methylpyrrolidone, while stirring, until initial material can no longer be detected. The reaction mixture is cooled to 5° to 10° C., the deposited crystals are filtered off by suction, washed with methanol and dried. 90 parts of 2-phenyl-4,6-dichloro-1,3,5-triazine having a melting point of 121° to 122° C. is obtained.

*Example 8*

Phosgene is introduced at 100° C. into a suspension of 100 parts of 2-phenyl-4,6-dihydroxy-1,3,5-triazine, 130 parts of o-dichlorobenzene and 25 parts of N-ethylcaprolactam, while stirring, until the 2-phenyl-4,6-dihydroxy-1,3,5-triazine has dissolved and can no longer be detected. The solution is then cooled to 0° C. 25 parts of methanol is added, the temperature not being allowed to rise above 10° C. The deposited crystals are filtered off by suction, washed with methanol, and dried at 30° C. 100 parts of 2-phenyl-4,6-dichloro-1,3,5-triazine is obtained as colorless crystals having a melting point of 118° to 120° C.

*Example 9*

Phosgene is introduced at 100° C. into a suspension of 100 parts of 2-(p-methoxyphenyl)-4,6-dihydroxy-1,3,5-triazine, 130 parts of o-dichlorobenzene and 25 parts of dimethylformamide, while stirring, until the 2-(p-methoxyphenyl)-4,6-dihydroxy-1,3,5-triazine has dissolved and can no longer be detected. The solution is then cooled to 5° C. 25 parts of methanol is added, the temperature not being allowed to rise above 10° C. The precipitated crystals are filtered off by suction, washed with methanol, and dried at 30° C. 80 parts of 2-(p-methoxyphenyl)-4,6-dichloro-1,3,5-triazine is obtained as colorless crystals having a melting point of 137° to 138° C.

*Example 10*

Phosgene is introduced at 100° C. into a suspension of 100 parts of 2-phenyl-4,6-dihydroxy-1,3,5-triazine, 130 parts of o-dichlorobenzene and 25 parts of diethylformamide, while stirring, until the 2-phenyl-4,6-dihydroxy-1,3,5-triazine has dissolved and can no longer be detected. The solution is then cooled to 0° C. 25 parts of methanol is added, the temperature not being allowed to rise above 10° C. The precipitated crystals are filtered off by suction, washed with methanol, and dried at 30° C. 105 parts of 2-phenyl-4,6-dichloro-1,3,5-triazine is obtained as colorless crystals having a melting point of 118° to 120° C.

*Example 11*

Phosgene is introduced at 100° C. into a suspension of 100 parts of 2-phenyl-4,6-dihydroxy-1,3,5-triazine, 200 parts of tetrachloroethane and 20 parts of dimethylformamide, while stirring, until the 2-phenyl-4,6-dihydroxy-1,3,5-triazine has dissolved and can no longer be detected. The solution is then cooled to 0° C. 50 parts of methanol is added, the temperature not being allowed to rise above 10° C. The precipitated crystals are filtered off by suction, washed with methanol, and dried at 30° C. 105 parts of 2-phenyl-4,6-dichloro-1,3,5-triazine is obtained as colorless crystals having a melting point of 118° to 120° C.

*Example 12*

Phosgene is introduced at 100° C. into a suspension of 100 parts of 2-phenyl-4,6-dihydroxy-1,3,5-triazine, 150 parts of dioxane and 20 parts of dimethylformamide, while stirring, until the 2-phenyl-4,6-dihydroxy-1,3,5-triazine has dissolved and can no longer be detected. The solution is then cooled to 0° C. 50 parts of methanol is added, the temperature not being allowed to rise above 10° C. The deposited crystals are filtered off by suction, washed with methanol, and dried at 30° C. 98 parts of 2-phenyl-4,6-dichloro-1,3,5-triazine is obtained as colorless crystals having a melting point of 119° to 120° C.

*Example 13*

Phosgene is introduced at 100° C. into a suspension of 100 parts of 2-(p-chlorophenyl)-4,6-dihydroxy-1,3,5-triazine, 130 parts of o-dichlorobenzene and 25 parts of dimethylformamide, while stirring, until the 2-(p-chlorophenyl)-4,6-dihydroxy-1,3,5-triazine has dissolved and can no longer be detected. The solution is then cooled to 0° C. 50 parts of methanol is added, the temperature not being allowed to rise above 10° C. The deposited crystals are filtered off by suction, washed with methanol, and dried at 30° C. 90 parts of 2-(p-chlorophenyl)-4,6-dichloro-1,3,5-triazine is obtained as colorless crystals having a melting point of 149° to 150° C.

*Example 14*

Phosgene is introduced at 160° C. into a suspension of 100 parts of 2-phenyl-4,6-dihydroxy-1,3,5-triazine, 130 parts of o-dichlorobenzene and 40 parts of dimethylformamide, while stirring, until the 2-phenyl-4,6-dihydroxy-1,3,5-triazine has dissolved and is no longer detectable. The solution is then cooled to 0° C. 50 parts of methanol is added, the temperature not being allowed to rise above 10° C. The deposited crystals are filtered off by suction, washed with methanol, and dried at 30° C. 75 parts of 2-phenyl-4,6-dichloro-1,3,5-triazine is obtained as colorless crystals having a melting point of 118° to 120° C.

*Example 15*

Phosgene is introduced at 65° C. into a suspension of 100 parts of 2-phenyl-4,6-dihydroxy-1,3,5-triazine, 250 parts of o-dichlorobenzene and 90 parts of dimethylformamide, while stirring, until the 2-phenyl-4,6-dihydroxy-1,3,5-triazine has dissolved and can no longer be detected. The solution is then cooled to 0° C. 100 parts of methanol is added, the temperature not being allowed to rise above 10° C. The deposited crystals are filtered off by suction, washed with methanol, and dried at 30° C. 90 parts of 2-phenyl-4,6-dichloro-1,3,5-triazine is obtained as colorless crystals having a melting point of 119° to 121° C.

*Example 16*

Phosgene is introduced at 100° to 110° C. into a suspension of 100 parts of 2-phenyl-4,6-dihydroxy-1,3,5-triazine, 150 parts of tetrahydronaphthalene and 25 parts of dimethylformamide, while stirring, until the 2-phenyl-4,6-dihydroxy-1,3,5-triazine has dissolved and can no longer be detected. The solution is then cooled to 0° C. 25 parts of methanol is added, the temperature not being allowed to rise above 10° C. The deposited crystals are filtered off by suction, washed with methanol, and dried at 30° C. 100 parts of 2-phenyl-4,6-dichloro-1,3,5-triazine is obtained as colorless crystals having a melting point of 118° to 120° C.

*Example 17*

Phosgene is introduced at 90° to 100° C. into a suspension of 100 parts of 2-phenyl-4,6-dihydroxy-1,3,5-triazine, 130 parts of o-dichlorobenzene and 25 parts of N-formylpyrrolidine, while stirring, the 2-phenyl-4,6-dihydroxy-1,3,5-triazine gradually passing into solution. When all has dissolved, introduction of phosgene is continued for about 30 minutes to complete the reaction. The solution is then cooled to 10° C. 50 parts of methanol is added, the temperature not being allowed to rise. The deposited crystals are filtered off by suction, washed with methanol, and dried at 30° C. 100 parts of 2-phenyl-4,6-dichloro-1,3,5-triazine is obtained as colorless crystals having a melting point of 120° to 122° C.

*Example 18*

Phosgene is introduced at 90° to 100° C. into a suspension of 100 parts of 2-phenyl-4,6-dihydroxy-1,3,5-triazine, 130 parts of o-dichlorobenzene and 25 parts of N-methylformanilide, while stirring, until the 2-phenyl-4,6-dihydroxy-1,3,5-triazine has dissolved and can no longer be detected. The solution is then cooled to 10° C. 50 parts of methanol is added, the temperature not being allowed to rise. The deposited crystals are filtered off by suction, washed with methanol, and dried at 30° C. 100 parts of 2-phenyl-4,6-dichloro-1,3,5-triazine is obtained as colorless crystals having a melting point of 121° to 122° C.

*Example 19*

Phosgene is introduced at 100° to 110° C. into a suspension of 100 parts of 2-phenyl-4,6-dihydroxy-1,3,5-triazine, 125 parts of xylene and 25 parts of dimethylformamide, while stirring, until the 2-phenyl-4,6-dihydroxy-1,3,5-triazine has dissolved and can no longer be detected. The solution is then cooled to 0° C. 25 parts of methanol is added, the temperature not being allowed to rise above 10° C. The deposited crystals are filtered off by suction, washed with methanol, and dried at 30° C. 100 parts of 2-phenyl-4,6-dichloro-1,3,5-triazine is obtained as colorless crystals having a melting point of 118° to 120° C.

*Example 20*

Phosgene is introduced at 100° to 110° C. into a suspension of 100 parts of 2-phenyl-4,6-dihydroxy-1,3,5-triazine, 150 parts of toluene and 25 parts of dimethylformamide, while stirring, until the 2-phenyl-4,6-dihydroxy-1,3,5-triazine has dissolved and can no longer be detected. The solution is then cooled to 0° C. 25 parts of methanol is added, the temperature not being allowed to rise above 10° C. The deposited crystals are filtered off by suction, washed with methanol, and dried at 30°

C. 100 parts of 2-phenyl-4,6-dichloro-1,3,5-triazine is obtained as colorless crystals having a melting point of 119° to 121° C.

*Example 21*

Phosgene is introduced at 110° to 120° C. into a suspension of 125 parts of 2-(m-nitrophenyl)-4,6-dihydroxy-1,3,5-triazine, 220 parts of o-dichlorobenzene and 35 parts of dimethylformamide. When the 2-(m-nitrophenyl)-4,6-dihydroxy-1,3,5-triazine has dissolved and is no longer detectable, the solution is cooled to 10° C. 50 parts of methanol is added, the temperature not being allowed to rise. The deposited crystals are filtered off by suction, washed with methanol, and dried at 30° C. 105 parts of 2-(m-nitrophenyl)-4,6-dichloro-1,3,5-triazine is obtained as colorless crystals having a melting point of 148° to 150° C.

*Example 22*

Phosgene is introduced at 110° C. into a suspension of 100 parts of 2-phenyl-4,6-dihydroxy-1,3,5-triazine, 150 parts of anisole and 30 parts of dimethylformamide, while stirring, until the 2-phenyl-4,6-dihydroxy-1,3,5-triazine has dissolved and can no longer be detected. The solution is then cooled to 10° C. 50 parts of methanol is added, the temperature not being allowed to rise. The deposited crystals are filtered off by suction, washed with methanol, and dried at 30° C. 110 parts of 2-phenyl-4,6-dichloro-1,3,5-triazine is obtained as colorless crystals having a melting point of 122° to 123° C.

*Example 23*

Phosgene is introduced at 100° C. into a suspension of 100 parts of 2-phenyl-4,6-dihydroxy-1,3,5-triazine, while stirring, until the 2-phenyl-4,6-dihydroxy-1,3,5-triazine has dissolved and can no longer be detected. The solution is then cooled to 10° C. 50 parts of methanol is added, the temperature not being allowed to rise. The deposited crystals are filtered off by suction, washed with methanol, and dried at 30° C. 110 parts of 2-phenyl-4,6-dichloro-1,3,5-triazine is obtained as colorless crystals having a melting point of 122° to 123° C.

*Example 24*

A powerful stream of phosgene is introduced for 30 minutes into a mixture of 130 parts of o-dichlorobenzene and 50 parts of dimethylformamide. During this operation, the temperature should rise to 80° to 90° C. In the course of 30 minutes, a suspension of 100 parts of 2-phenyl-4,6-dihydroxy-1,3,5-triazine in 200 parts of o-dichlorobenzene is added to the solution, the temperature of the reaction mixture being raised to 90° to 100° C. To complete the reaction, introduction of phosgene into the reaction mixture is continued for 30 minutes. The solution is then cooled to 10° C. 100 parts of methanol is added, the temperature not being allowed to rise. The deposited crystals are filtered off by suction, washed with methanol, and dried at 30° C. 60 parts of 2-phenyl-4,6-dichloro-1,3,5-triazine is obtained as colorless crystals having a melting point of 120 to 122° C.

*Example 25*

Phosgene is introduced at 100° C. into a suspension of 60 parts of 2,4-diphenyl-6-hydroxy-1,3,5-triazine, 160 parts of o-dichlorobenzene and 15 parts of dimethylformamide, while stirring, until the 2,4-diphenyl-6-hydroxy-1,3,5-triazine has dissolved and can no longer be detected. The solution is then cooled to 10° C. 20 parts of methanol is added, the temperature not being allowed to rise. The deposited crystals are filtered off by suction, washed with methanol, and dried at 30 C. 60 parts of 2,4-diphenyl-6-chloro-1,3,5-triazine is obtained as colorless crystals having a melting point of 140° C.

*Example 26*

Phosgene is introduced at 100° C. into a suspension of 100 parts of 2-(p-toluyl-4,6-dihydroxy-1,3,5-triazine, 130 parts of o-dichlorobenzene and 30 parts of dimethylformamide, while stirring, until the 2-(p-toluyl)-4,6-dihydroxy-1,3,5-triazine has dissolved and can no longer be detected. The solution is then cooled to 10° C. 30 parts of methanol is added, the temperature not being allowed to rise. The deposited crystals are filtered off by suction, washed with methanol, and dried at 30° C. 85 parts of 2-(toluyl)-4,6-dichloro-1,3,5-triazine is obtained as colorless crystals having a melting point of 148° C.

*Example 27*

Phosgene is introduced at 110° to 120° C. into a suspension of 100 parts of 2-phenyl-4-hydroxy-6-nitroquinazoline, 325 parts of o-dichlorobenzene and 40 parts of dimethylformamide, while stirring, until the 2-phenyl-4-hydroxy-6-nitroquinazoline has dissolved and is no longer detectable. The solution is then cooled to 10° C. 50 parts of methanol is added, the temperature not being allowed to rise. The deposited crystals are filtered off by suction, washed with methanol and dried, 95 parts of 2-phenyl-4-chloro-6-nitroquinazoline is obtained as colorless crystals having a melting point of 193° to 195° C.

The 2-phenyl-4-hydroxy-6-nitroquinazoline used as initial material can be obtained as follows: 185 parts of 2-amino-5-nitrobenzamide is dissolved at room temperature in 1000 parts by volume of N-methylpyrrolidone. 150 parts of benzoyl chloride is introduced into this solution in small portions. The mixture is stirred for another 2 hours at room temperature and then poured into 4000 parts by volume of water. The precipitate is filtered off by suction, washed with water and dried.

150 parts of the 2-benzoylamino-5-nitrobenzamide thus obtained is stirred at 60° C. in 3000 parts by volume of 1 N aqueous sodium hydroxide solution until the amide has dissolved. As a rule, this takes about 1½ to 2 hours. The reaction product is then filtered off by suction, stirred with water, and made strongly acid with 10% aqueous sulfuric acid. The suspension is stirred for another 2 hours, filtered by suction, washed acid-free and dried. The product obtained is 2-phenyl-4-hydroxy-6-nitroquinazoline.

*Example 28*

Phosgene is introduced at 110° C. into a suspension of 100 parts of 2-phenyl-4-hydroxyquinazoline, 150 parts of o-dichlorobenzene and 15 parts of dimethylformamide, while stirring, until the 2-phenyl-4-hydroxyquinazoline has dissolved and can no longer be detected. The solution is then cooled to 10° C. 30 parts of methanol is added, the temperature not being allowed to rise. The deposited crystals are filtered off by suction, washed with methanol, and dried at 30° C. 70 parts of 2-phenyl-4-chloroquinazoline is obtained as colorless crystals having a melting point of 126° C.

*Example 29*

Phosgene is introduced at 100° C. into a suspension of 10 parts of 5-phenyl-4,6-dihydroxypyrimidine, 15 parts of o-dichlorobenzene and 3.5 parts of dimethylformamide, while stirring, until the 5-phenyl-4,6-dihydroxypyrimidine has dissolved and can no longer be detected. The solution is then cooled to 5° C. 5 parts of methanol is added, the temperature not being allowed to rise above 10° C. The deposited crystals are filtered off by suction, washed with methanol, and dried at 30° C. 9 parts of 5-phenyl-4,6-dichloropyrimidine is obtained as colorless crystals having a melting point of 109° C.

When, for comparison purposes, phosgene is introduced at 100° C. into a suspension of 10 parts of 5-phenyl-4,6-dihydroxypyrimidine and 15 parts of o-dichlorobenzene for 7 hours, while stirring, no dissolution takes place. When the mixture is cooled to room temperature and the crystals are filtered off by suction, washed with methanol, and dried at 30° C. 9.5 parts of unchanged 5-phenyl-4,6-dihydroxypyrimidine is obtained which melts at about 350° C. with decomposition.

Example 30

Phosgene is introduced at 100° to 110° C. into a suspension of 100 parts of 2-(m-chlorosulfophenyl)-4,6-dihydroxy-1,3,5-triazine, 130 parts of o-dichlorobenzene and 25 parts of dimethylformamide until the 2-(m-chlorosulfophenyl)-4,6-dihydroxy-1,3,5-triazine has dissolved and can no longer be detected. The solution is then cooled to 10° C. 50 parts of methanol is added, the temperature not being allowed to rise. The deposited crystals are filtered off by suction, washed with methanol, and dried at 30° C. 85 to 95 parts of 2-(m-chlorosulfophenyl)-4,6-dichloro-1,3,5-triazine is obtained as colorless crystals having a melting point of 139° to 140° C.

The 2-(m-chlorosulfophenyl)-4,6-dihydroxy-1,3,5-triazine used as initial material can be obtained as follows: a mixture of 100 parts of 2-phenyl-4,6-dihydroxy-1,3,5-triazine and 900 parts of chlorosulfonic acid is heated for 3 hours at a gentle boil. The reaction mixture is then cooled to 10° C. and introduced into 5000 parts of ice water. The deposited crystals are filtered off by suction, washed with water, and dried in vacuo at 60° C. The yield is 125 parts of 2-(m-chlorosulfophenyl)-4,6-dihydroxy-1,3,5-triazine as a colorless crystal powder having a melting point of 270° to 272° C.

Example 31

Phosgene is introduced at 110° C. into a suspension of 100 parts of 2-(p-carboxyphenyl)-4-hydroxyquinazoline, 1100 parts of nitrobenzene and 70 parts of dimethylformamide until dissolution has taken place and initial material can no longer be detected. The solution is then cooled to 0° C. The deposited crystals are filtered off by suction, washed with a small quantity of acetone, then with methanol, and dried at 30° C. 85 to 90 parts of 2-(p-chlorocarboxyphenyl)-4-chloroquinazoline is obtained as colorless crystals with a melting point of 155° to 156° C.

Example 32

Phosgene is introduced at 100° to 110° C. into a suspension of 100 parts of 2-(m-dimethylaminosulfophenyl)-4,6-dihydroxy-1,3,5-triazine, 200 parts of o-dichlorobenzene and 30 parts of dimethylformamide until dissolution has taken place and initial material can no longer be detected. The solution is then cooled to 10° C. 30 parts of methanol is added, the temperature not being allowed to rise. The deposited crystals are filtered off by suction, washed with methanol, and dried at 30° C. 90 parts of 2-(m-dimethylaminosulfophenyl)-4,6-dichloro-1,3,5-triazine is obtained in the form of colorless crystals having a melting point of 172° to 173° C.

The 2-(m-dimethylaminosulfophenyl)-4,6-dihydroxy-1,3,5-triazine used as initial material can be obtained in the following manner: a mixture of 100 parts of 2-(m-chlorosulfophenyl)-4,6-dihydroxy-1,3,5-triazine, 400 parts of 40% aqueous dimethylamine solution and 600 parts of water is heated at the boil for five minutes, while cooling by means of reflux. The reaction mixture is then cooled to 0° C. The deposited crystals are filtered off by suction, washed with water and dried. 100 parts of 2-(m-dimethylaminosulfophenyl)-4,6-dihydroxy-1,3,5-triazine is obtained in the form of colorless acicular crystals having a melting point of 301° to 304° C.

Example 33

Phosgene is introduced at 100° to 110° C. into a suspension of 100 parts of 2-(m-sulfophenyl)-4,6-dihydroxy-1,3,5-triazine, 160 parts of o-dichlorobenzene and 30 parts of dimethylformamide until dissolution has taken place and initial material can no longer be detected. The solution is cooled to 10° C. and mixed with 30 parts of methanol, the temperature not being allowed to rise. The deposited crystals are filtered off by suction, washed with methanol, and dried at 30° C. 85 parts of 2-(m-chlorosulfophenyl)-4,6-dichloro-1,3,5-triazine is obtained as colorless crystals with a melting point of 138° to 140° C.

Example 34

Phosgene is introduced at 100° to 110° C. into a suspension of 100 parts of 2-(m-carboxyphenyl)-4,6-dihydroxy-1,3,5-triazine, 160 parts of o-dichlorobenzene and 30 parts of dimethylformamide until dissolution has taken place and initial material can no longer be detected. The solution is then cooled to 0° C. 20 parts of glacial acetic acid is added, the temperature not being allowed to rise. The deposited crystals are filtered off by suction, washed with cyclohexane, and dried at 30° C. 90 parts of 2-(m-chlorocarboxyphenyl)-4,6-dichloro-1,3,5-triazine is obtained as colorless crystals with a melting point of 115° to 116° C.

What we claim is:

1. In a process for the production of heterocyclic chlorine-containing nitrogen compounds selected from the group consisting of chlorinated quinazolines, quinoxalines and 1,3,5-triazines containing a chlorine atom in vicinal position to at least one ring nitrogen atom and further of chlorinated quinazolines, quinoxalines and 1,3,5-triazines containing two chlorine atoms each in vicinal position to at least one ring nitrogen atom from heterocyclic hydroxy nitrogen compounds selected from the group consisting of hydroxyquinazolines, hydroxyquinoxalines and hydroxy 1,3,5-triazines containing a hydroxyl group in vicinal position to at least one ring nitrogen atom and hydroxyquinazolines, hydroxyquinoxalines and hydroxy 1,3,5-triazines containing two hydroxyl groups each in vicinal position to at least one ring nitrogen atom by reaction with phosgene at a temperature of 60° to 160° C. in the presence of an inert diluent, the improvement of carrying out the reaction in the presence of a carboxylic acid amide represented by the formula

in which $R_1$ denotes a member selected from the group consisting of a hydrogen atom and an alkyl radical with 1 to 5 carbon atoms, $R_2$ denotes an alkyl radical with 1 to 4 carbon atoms, and $R_3$ denotes a member selected from the group consisting of an alkyl radical with 1 to 4 carbon atoms, an aryl radical with 6 to 9 carbon atoms, together with $R_2$ and alkylene group with 2 to 8 methylene groups, one of which may be replaced by an oxygen atom, and together with $R_1$ an alkylene group with 3 to 7 carbon atoms.

2. The improvement according to claim 1, wherein the weight ratio between said heterocyclic hydroxy nitrogen compound and diluent is from 10:90 to 80:20.

3. The improvement according to claim 1, wherein the amount of carboxylic acid amide used is from 1 to 50 mole percent with reference to said heterocyclic hydroxy nitrogen compound.

4. A process as claimed in claim 1 wherein said carboxylic acid amide is N,N-dimethylformamide.

5. A process as claimed in claim 1 wherein said carboxylic acid amide is N-methylpyrrolidone.

6. A process as claimed in claim 1 wherein said carboxylic acid amide is N-methylcaprolactam.

7. A process as claimed in claim 1 wherein said carboxylic acid amide is N,N-diethylformamide.

8. In a process for the production of chlorine-substituted triazines with 1–2 chlorine atoms, each in vicinal position to a ring nitrogen atom, from a hydroxy-substituted triazine with 1–2 hydroxy groups, each in vicinal position to a ring nitrogen atom, by reaction with phosgene at a temperature of 60 to 160° C. in an inert diluent, the improvement of carrying out said reaction in the presence of a carboxylic acid amide represented by the formula

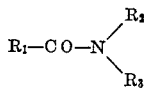

in which $R_1$ denotes a member selected from the group consisting of a hydrogen atom and an alkyl radical with 1 to 5 carbon atoms, $R_2$ denotes an alkyl radical with 1 to 4 carbon atoms, and $R_3$ denotes a member selected from the group consisting of an alkyl radical with 1 to 4 carbon atoms, an aryl radical with 6 to 9 carbon atoms, together with $R_2$ an alkylene group with 2 to 8 methylene groups, one of which may be replaced by an oxygen atom, and together with $R_1$ and alkylene group with 3 to 7 carbon atoms.

References Cited

UNITED STATES PATENTS

| | | | |
|---|---|---|---|
| 2,231,659 | 2/1941 | Brooker et al. | 260—304 |
| 2,934,525 | 4/1960 | Fekete | 260—248 |
| 2,154,889 | 4/1939 | Braun et al. | 260—251 |
| 3,108,104 | 10/1963 | Seefelder et al. | 260—251 |

FOREIGN PATENTS

| | | |
|---|---|---|
| 310,815 | 7/1930 | Great Britain. |
| 693,540 | 7/1953 | Great Britain. |

OTHER REFERENCES

Bosshard et al., Helv. Chim. Acta, vol. 44, pages 1203 to 1211 (Aug. 1, 1961).

Elderfield, Heterocylic Compounds, vol. 5, pages 101–2 and 539–541, John Wiley and Sons (1957).

Allied Chemical Product Bulletin on "Cyanuric Acid," page 1, Allied Chemical Company, Nitrogen Division (New York), May 1959.

Rath, Annalen der Chemie, vol. 486, pages 71 to 80 (1931).

Adams et al., Journ. of the Am. Chem. Soc., vol. 74, pages 3171–3173 (1952).

Chem. Abstr., vol. 53, col. 4112 (1959).

Abstr. of Arnold, Chem. Listy, vol. 52, 2013–14 (1958).

JOHN D. RANDOLPH, *Primary Examiner.*

I. MARCUS, WALTER A. MODANCE, *Examiners.*

UNITED STATES PATENT OFFICE
CERTIFICATE OF CORRECTION

Patent No. 3,365,452                           January 23, 1968

Hans Weidinger et al.

It is certified that error appears in the above identified patent and that said Letters Patent are hereby corrected as shown below:

Column 2, line 56, "hydrovyquinoxaline" should read -- hydroxyquinoxaline --. Column 13, line 15, "with $R_1$ and" should read -- with $R_1$ an --.

Signed and sealed this 16th day of December 1969.

(SEAL)
Attest:

Edward M. Fletcher, Jr.                          WILLIAM E. SCHUYLER, JR.
Attesting Officer                                         Commissioner of Patents